Patented Jan. 28, 1941

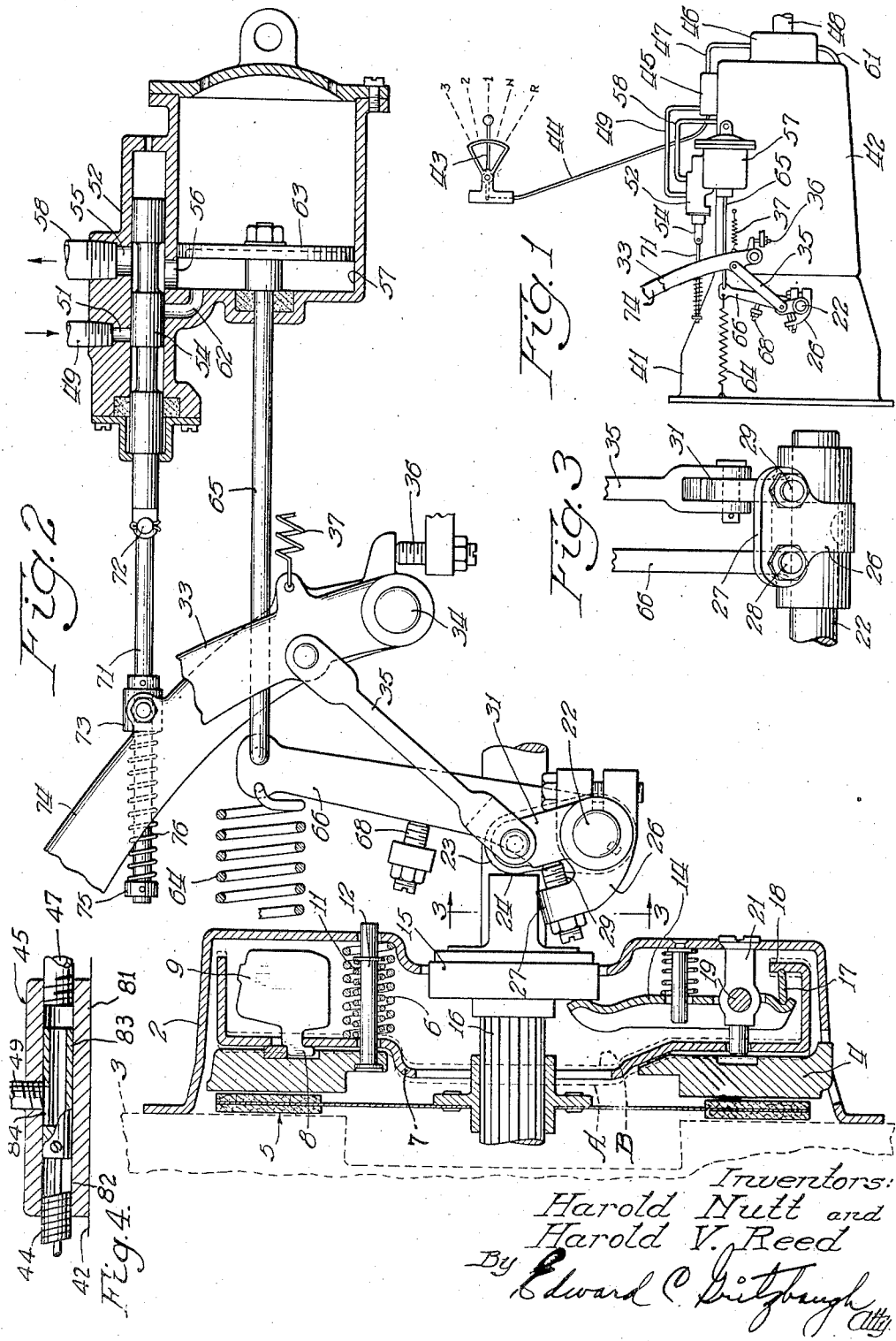

2,230,050

UNITED STATES PATENT OFFICE 2,230,050

AUTOMATIC CLUTCH SYSTEM

Harold Nutt and Harold V. Reed, Chicago, Ill., assignors to Borg-Warner Corporation, Chicago, Ill., a corporation of Illinois Application February 23, 1938, Serial No. 191,986

25 Claims. (Cl. 192—4)

Our invention relates to improvements in automatic clutch systems, and more particularly to a clutch system for motor vehicles, incorporating a so-called engine or main clutch of the centrifugal type, adapted for use with an automatic or simi-automatic transmission.

In many types of automatic and semi-automatic transmissions, a speed-responsive control device is employed to determine the car speed at which a shift in driving ratio is to take place. Taking an average transmission, we have noted that the shift from low, or starting range, to intermediate range, may take place at from five to ten miles per hour, and from intermediate range to high speed range at or around fifteen miles per hour. When a centrifugal or speed-responsive clutch is used as the engine clutch with such transmission, the clutch must be locked out against automatic release in all speed ranges above the starting speed range so that the car may be driven in such ranges at low car speed without the engine clutch slipping. A present practice is to lock the centrifugal clutch in its fully engaged position in all speed ranges except starting speed range and reverse. This means in effect that in an automatic or semi-automatic transmission, the speed-responsive control device, which is timed properly for the shifting from one speed range to another, is not suitable for releasing the engine clutch as when the car is brought to a stop by brake application when in any speed range above starting range. This same practice may be carried out with a hand shift transmission or remote control manual shift transmission.

If it were possible, in the combinations above described, for the engine clutch to release by the functioning of its centrifugal weights, the stalling of the engine would not occur during application of the brake to stop the car when in its intermediate or high speed range, because the engine speed at which the centrifugal weights disengage is normally in the neighborhood of fifteen miles per hour, a speed comparable in an automatic or semi-automatic transmission to the shift from intermediate to high speed range. Such functioning of the centrifugal clutch, however, is not consistent with its duty in connection with the transmission mentioned as viewed in the light of prior teachings.

It is an object of our invention, therefore, to provide an improved automatic clutch system incorporating a centrifugal clutch as a main or engine clutch wherein means are provided for maintaining the clutch in its fully engaged position at all times during which the transmission is set for speed ranges above starting range, but wherein manual application of the vehicle brake during driving in such higher speed ranges will immediately restore the clutch to its automatic position.

A further object of our invention is to provide an improved clutch system wherein the engine clutch may be manually released at any time, regardless of the speed range at which the transmission is operating and without regard to brake pedal position.

A further object is to provide an improved clutch system, as herein described, for use with automatic, semi-automatic, or manual shift transmissions wherein the engine clutch is of substantially conventional construction, and is assembled and mounted independently of the mechanism forming a part of the transmission.

Other objects, the advantages and uses of the invention will become apparent after reading the following specification and claims, and after consideration of the drawing forming a part of the specification, wherein:

Fig. 1 is a side elevation of a clutch and transmission assembly incorporating the features of our invention, the brake pedal being shown in its fully retracted position;

Fig. 2 is a vertical sectional view through the essential operating elements of the clutch system illustrated in Fig. 1, the brake pedal being shown in partially applied position;

Fig. 3 is a fragmentary elevation viewed on the line 3—3 of Fig. 2; and

Fig. 4 is a detailed sectional view of the selector valve.

With reference to Fig. 2, the main or engine clutch employed may be of a conventional centrifugal type such as illustrated in U. S. Letters Patent No. 2,070,892, and may comprise a clutch cover 2 adapted to be fixed upon the flywheel 3 of a motor vehicle engine, a pressure plate 4 yieldingly urged toward the driven plate 5 of the clutch by a plurality of compression springs 6 acting through a spring mounting ring 7 and the toes 8 of a plurality of centrifugally responsive weight elements 9. The pressure plate 4 and mounting ring 7 may be urged yieldingly toward one another by a compression spring 11 acting through a draw bolt 12 secured to the pressure plate, thus to minimize rattle of the parts, and to cause the pressure plate to recede when the mounting ring is drawn rearwardly against the forces of the spring 6.

As indicated in dotted lines in Fig. 2, the mounting ring 7 may have three operating positions. The position indicated in dotted lines at A is that position assumed under normal action of the springs 6 to cause the clutch to remain in its engaged position regardless of the position of the weights 9. The position of the ring, as indicated in dotted lines at B, is that position assumed when the clutch is fully disengaged, as by manipulation of the clutch pedal, and the full line position represents the position of the ring when the clutch is set in its automatic operation and engagement and disengagement under control of the centrifugal weights 9.

At 14 we have indicated one of a plurality of clutch release or control levers each bearing, at its inner end, upon a release collar 15 slidably mounted upon the transmission drive shaft 16. The outer ends of each of the levers 14 may be connected through struts 17 to overhanging portions 18 of the spring mounting ring 7. Each lever may be fulcrumed, as indicated at 19, upon a mounting stud 21.

Manual release of the engine clutch by movement of the mounting ring 7 to the dotted line position at B may be effected through the instrumentality of a rock shaft 22 having a bifurcated portion 23 engageable with the collar assembly 15, as indicated at 24. At a point on the rock shaft 22 and laterally spaced from the fork 23, an arm 26 is fixed and formed at its outer extremity with an elongated head 27 (see Fig. 3) provided with a pair of spaced apart adjustment screws 28 and 29.

The screw 29 serves as an abutment against which an arm 31, pivoted upon the rock shaft 22, may engage to rock the shaft 22 so as to depress the operating collar 15 inwardly and to release the clutch. The clutch pedal, the inner end of which is indicated at 33, may be pivotally mounted at 34 and interconnected with the arm 31 by an operating rod 35. The pedal 33 is held normally against an adjustable stop 36 by a pedal release spring 37.

The construction thus far described is representative of a typical centrifugal engine clutch assembly.

Our invention is directed particularly to the adaptation of a clutch of this type to a transmission mechanism having a starting speed range and one or more driving speed ranges, in addition, of course, to a reverse drive position, and wherein the transmission may remain in its driving speed ranges during deceleration of the vehicle to a speed below that at which the centrifugal weight of the clutch would normally act to release the clutch.

We have illustrated one such transmission schematically in Fig. 1, omitting specific illustration of the gears and gear shift or clutch mechanism contained therein, since such particular mechanism does not form a part of our invention, and we have selected a remote control manually operated transmission as best suitable for simplicity of disclosure.

With reference to Fig. 1, we have shown at 41 the clutch housing within which the centrifugal clutch may be disposed, and at 42 the transmission housing within which the transmission is contained. At 43 there is illustrated the manual control lever for determining the speed at which the transmission is to operate. The lever 43, as indicated, has one starting and two driving ranges marked 1, 2 and 3 respectively, a neutral position and a reverse position as indicated at "N" and "R." Such lever may be connected through a Bowden wire 44 to a valve housing 45 for controlling the passage of oil under pressure developed by a pump 46 and transmitted thereto through the line 47. The pump 46 may be disposed upon the transmission driven shaft 48 so as to be driven thereby. Within the transmission housing 42 there may be disposed a fluid controlled transmission of any well known character responsive in its shift from one speed range to another by the positioning of the valve 45 under control of the lever 43. The valve 45 may include a housing 81 formed with a bore 82, and a hollow valve element 83, open at its end adjacent the tube 47, closed at its other end, and slidable in the bore 82. The valve element 83 is provided with a port 84 adapted, when the lever 43 is adjusted to the second or third speed driving range, to communicate with the tube 49. As shown in Fig. 4, the valve element is in the second speed range. In either the first speed range, neutral or reverse, the valve element 83 is adapted to close off the tube 49 so as to prevent the flow of fluid from the tube 47 to the tube 49. These three positions lie to the left of the position shown in Fig. 4. It is to be understood that Fig. 4 is simply for the purpose of illustrating a valve which is capable of performing the function called for in the valve 45, and that other valves capable of performing this function may be equally as well employed in connection with our invention, which is not in any way restricted to the particular valve shown.

At 49 there is illustrated a tube interconnecting the valve 45 with the valve port 51 of a valve housing 52 (see Fig. 2 for detail). The valve 45 may be so constructed that when the valve is moved to its second and third speed or driving ranges, oil under pressure from the pump 46 may be conducted through the tube 49 to the valve port 51, and may flow back into the transmission housing when the valve 45 is set for starting speed range, neutral or reverse.

With reference again to Fig. 2, there is located within the valve housing 52, a valve plunger 54 which, in the position indicated in full lines, is set to establish communication between an outlet port 55 and a port 56 located at one end of a fluid motor cylinder 57. The port 55 may be connected through a discharge tube 58 with the interior of the transmission housing 42 and is intended to discharge oil from the cylinder 57 back to the transmission housing 42, from which the oil is drawn through a tube 61 to the inlet of the pump 46. The port 51 of the valve is shown closed, but when the plunger 54 is moved to the right from its position shown, the port 51 will communicate with a passageway 62, also communicating with the said one end of the cylinder 57. At this position of the valve, communication between the ports 55 and 56 will be closed, so that oil under pressure admitted through the passageway will cause a piston 63 located within the cylinder to move inwardly of the cylinder against the pull of a tension spring 64 acting through a piston rod 65 and arm 66.

The arm 66 is, as in the case of the arm 31, pivotally mounted upon the rock shaft 22 and is in alignment with the adjustment screw 28 so that rotation of the arm 66 in a counterclockwise direction, as viewed in Fig. 2, will transmit force from the spring 64 to turn the rock shaft 22 an amount sufficient to cause the clutch spring ring 7 to be urged and held in its full line position as shown in the drawing. The limit of counterclockwise movement of the arm 66 may be accurately maintained by means of an adjustable stop screw 68, and suitable adjustments thereof may be made from time to time to compensate for clutch wear.

Means for operating the valve plunger 54 may comprise a rod 71 pivoted at 72 to the valve plunger and extending through a collar 73 which is pivotally connected to the brake pedal 74 of the vehicle. The rod 71 is preferably of sufficient length to extend beyond the collar 73, and there is interposed between the collar and a fixed stop 75, a compression spring 76 through which force may be transmitted through the rod 71 and hence to the valve plunger 54 to urge the plunger into the position shown as when the brake pedal 74 is depressed. This brake pedal position is the one indicated in the drawing. Continued movement of the brake pedal beyond that required to so shift the valve 54, may take place by virtue of the compressibility of the spring 76.

In a motor vehicle equipped with our improved clutch system, as above described, the driver may start the vehicle by moving the control lever 43 to first position, the engine at this time running at idle speed with the weights 9 at their radially inward positions. As the engine speed is now increased by acceleration, the weights 9 will be caused to move radially outwardly to urge the pressure plate 4 of the clutch into driving engagement with the clutch driven plate 5, thus to start the vehicle upon its way. This function of the clutch will take place, as described, because with the transmission set for first speed, or starting range, the oil cylinder 57 will be empty, and the spring 64 will hold the control arm 66 against the stop 68, thereby to maintain the clutch spring mounting ring 7 in position for automatic clutch operation as indicated in Fig. 2. It will be noted that with the transmission set for first or starting range, no oil under pressure is available from the pump 46 because of the position of the transmission control valve assembly 45 as described.

If now the transmission is set from first, or starting range to one of its driving ranges, such as second or third speed, as by movement of the lever 43, oil under pressure from the pump 46 will be conducted through the transmission control valve 45, the tube 49, and through the plunger valve 54 (which, with the brake pedal, is to the right of the position in Fig. 2 at this time) and into the oil cylinder 57. As the oil cylinder 57 receives oil under pressure from the pump 46 by virtue of operation of the transmission drive shaft as the vehicle is driven, the piston 63 will move to the right, as viewed in Fig. 2, to rock the control arm 66 in a clockwise direction against the action of the spring 64. This procedure results in relieving the spring mounting plate of the influence of the spring 64 through the instrumentality of the release levers 14, and permits the clutch springs 11 to act unrestrictedly to hold the pressure plate 4 in positive frictional driving engagement with the driven disc 5 without regard to position of the weights 9. Because of the leverage provided by the arms 66 and the release levers 14, the springs 64 will exert a force upon the ring 7 superior to that exerted by the combined forces of the springs 11. The clutch at this time may be said to be "locked up" and is not subject to automatic operation.

Assuming the motor vehicle to be operating in one of its driving ranges, as indicated by second or third speed positions of the lever 43, the driver may decelerate the vehicle to low speeds with the engine operating at a R. P. M. wherein the centrifugal weights 9 will tend to lie in their radially inward or inoperative positions without disturbing the "locked up" condition of the clutch, and hence the relatively positive drive of the power transmitting mechanism. This arrangement permits the driver to employ the engine as a brake for deceleration, and of course precludes clutch slippage at low speeds which is predominantly prevalent in automatic clutches of the centrifugally operated type. In the event it is desired to stop the vehicle by brake application, initial braking movement of the brake pedal 74 will cause the valve plunger 54 to be moved to the position it occupies in Fig. 2 through the instrumentality of the elements 71—73—76—75, thus quickly "dumping" the oil from the cylinder 57 through the discharge ports 56—55, and closing the oil inlet ports 51—62. As oil is thus discharged from the cylinder 57 upon brake pedal operation, the piston 63 will move to the position shown under action of the spring 64 and the clutch will be promptly restored to its automatic position where it may respond as to engagement or disengagement to engine R. P. M. If the speed of the engine at this time is such that the weights 9 tend to lie radially inwardly, the clutch will be fully released. If, however, the speed of the engine is above that required to move the weights 9 outwardly, the clutch will remain engaged even though the brake is applied, and will so remain until the vehicle has been decelerated an amount to cause engine speed to fall below the R. P. M. required automatically to release the clutch.

It will appear from the foregoing that we have provided an extremely simple automatic clutch system wherein the clutch is "locked up" at all times during which the transmission is set in its driving ranges so that the driver may have all of the benefits of engine braking and complete elimination of clutch slippage at low speeds in the driving ranges, and yet retain all of the advantages of immediate clutch release when it is desired to stop the vehicle by brake application.

Heretofore it has been proposed to provide a speed governor in an automatic or semi-automatic transmission which will serve to engage the main drive clutch at a given R. P. M. upon acceleration, and to release the main clutch upon a given and lower R. P. M. during deceleration, as in braking. Such proposed constructions, however, all possess the disadvantage of incomplete clutch release in the very short time permitted between the assumption of the release speed of the transmission and the complete application of the brake, thus causing the engine to stall. Stalling of the engine in the clutch system which we have herein described is impossible under such circumstances because of the substantially immediate functioning of the oil cylinder to clutch control linkage upon initiation of brake pedal movement.

In automatic clutch systems it is further required that some provision be made for starting the vehicle by pushing or towing, such for example, as when the starting mechanism is out of order. This procedure may be carried out with ease in our proposed clutch system by first placing the transmission in one of its driving speed positions, such for example as by moving the lever 43 to second or third position. With the transmission so set, it is merely necessary to push or to tow the vehicle, whereupon oil pressure will be developed by the pump 46 turning with the transmission driven shaft, and such oil pressure will be conveyed through the valve 45, the tube 49, and the plunger valve 54 into the cylinder 57 to rock the arm 66 in a clockwise direction, thereupon causing the clutch to become engaged. As the clutch is engaged, the engine of course will be turned over and thus subjected to starting movement in the same manner as though the starter had been placed in operation.

We claim:

1. In a clutch system for a motor vehicle having a braking mechanism and a change speed transmission and wherein said transmission has a driving range and a starting range; a clutch, speed-responsive means adapted at low speeds to cause said clutch to disengage, said clutch being adapted, when said transmission is adjusted to its driving range, to normally be free of control by said speed-responsive means, so as to remain in engaged condition irrespective of speed, and means controlled by said braking mechanism for causing said clutch to become subject to control by the speed-responsive means when the brake is applied, while the transmission remains adjusted to the driving range.

2. In a clutch system for a motor vehicle having a braking mechanism and a change speed transmission and wherein said transmission has a driving range and a starting range; a centrifugal clutch adapted, when said transmission is adjusted to its starting range, to assume a position of adjustment in which it is speed-responsive, and, when said transmission is adjusted to its driving range, to normally assume a position of adjustment in which it remains in engaged condition irrespective of speed, and means operated by said braking mechanism when the brake is applied, for causing said clutch to resume the speed-responsive position while said transmission remains adjusted to the driving range.

3. In a clutch system for a motor vehicle having a brake element and a change speed transmission and wherein said transmission has a driving range and a starting range; a centrifugal clutch adapted to assume either a position in which it is speed-responsive or a lock-up position in which it remains in engaged condition irrespective of speed, means for causing said clutch to assume its lock-up position when said transmission is adjusted to the driving range, and means controlled by said brake element for rendering said last mentioned means inoperative so as to cause said clutch to assume the speed-responsive position when the brake is applied.

4. In a clutch system for a motor vehicle having a braking mechanism, a clutch adaped to be in engagement when the vehicle is being driven at normal driving speeds, means responsive to reduction in speed below a predetermined level, for causing said clutch to become disengaged, means for locking said clutch against such speed-responsive disengagement, and means controlled by said braking mechanism for rendering said last mentioned means inoperative so as to cause said speed-responsive means to become operative when the brake is applied.

5. In a clutch system for a motor vehicle having a braking mechanism and a change speed transmission and wherein said transmission has a driving range and a starting range; a centrifugal clutch adapted to assume either a position in which it is speed-responsive, or a lock-up position in which it remains in engaged condition irrespective of speed, a fluid motor operatively associated with said clutch so as to cause the same to assume its lock-up position when said transmission is adjusted to the driving range, means for supplying fluid under pressure to said motor for operating the same, and a valve operatively connected to said brake element and controlling said motor so as to allow fluid to enter the motor when the brake is not applied, and to cut off the supply of fluid to the motor and release the fluid in the motor so as to permit said clutch to resume its speed-responsive position when the brake is applied.

6. In a clutch system for a motor vehicle having a braking mechanism and a change speed transmission and wherein said transmission has a driving range and a starting range; a centrifugal clutch adapted to assume either a position in which it is speed-responsive or a lock-up position in which it remains in engaged condition irrespective of speed, resilient means yieldingly urging said clutch toward speed-responsive position, means for counteracting the effect of said resilient means and causing said clutch to assume its lock-up position when said transmission is adjusted to the driving range, and means controlled by said brake element for rendering said last mentioned means inoperative so as to permit said clutch to resume speed-responsive position when the brake is applied.

7. In a clutch system for a motor vehicle having a braking mechanism and a change speed transmission and wherein said transmission has a driving range and a starting range; a centrifugal clutch adapted to assume either a position in which it is speed-responsive, a lock-up position in which it remains in engaged condition irrespective of speed, or a full release position in which it remains in disengaged condition irrespective of speed, means for causing said clutch to assume its lock-up position when said transmission is adjusted to the driving range, means controlled by said brake element for rendering said last mentioned means inoperative so as to cause said clutch to assume its speed-responsive position when the brake is applied, and an operative connection between said clutch pedal and said clutch whereby said clutch may be adjusted to full release position by depression of said pedal.

8. In a clutch system for a motor vehicle having a braking mechanism and a change speed transmission and wherein said transmission has a driving range and a starting range; a centrifugal clutch adapted to assume either a position in which it is speed-responsive, a lock-up position in which it remains in engaged condition irrespective of speed, or a full release position in which it remains in disengaged condition irrespective of speed, means for causing said clutch to assume its lock-up position when said transmission is adjusted to the driving range, means controlled by said brake element for rendering said last mentioned means inoperative so as to cause said clutch to assume its speed-responsive position when the brake is applied, and a lost motion connection between said clutch pedal and the clutch allowing said brake element controlled means to operate without effecting said clutch pedal, and serving to cause said clutch to assume the full release position upon depression of said pedal.

9. In a clutch system for a motor vehicle having a braking mechanism and a change speed transmission and wherein said transmission has a driving range and a starting range; a centrifugal clutch including an operating member adapted to assume either a position in which it permits said clutch to engage and disengage in response to speed of rotation, or a lock-up position in which it maintains said clutch engaged irrespective of speed, means controlled in accordance with the gear ratio setting of said transmission for causing said operating member to assume its lock-up position when said transmission is adjusted to the driving range, and means controlled by said brake operating device for rendering said last mentioned means inoperative so as to cause said operating member to assume its speed-responsive position when the brake is applied.

10. In a clutch system for a motor vehicle having a brake operating device and a transmission control element; a centrifugal clutch including operating mechanism adapted to assume either a position in which it is speed-responsive, or a lock-up position in which it maintains the clutch in engaged condition irrespective of speed; means controlled by said transmission control element for causing said mechanism to assume its lock-up position when said transmission control element is moved from low or reverse gear position to intermediate or high gear position, and means controlled by said brake operating device for rendering said last named means inoperative so as to cause said mechanism to assume its speed-responsive position when said device is operated to apply the brake.

11. In a clutch system for a motor vehicle having a brake operating device and a transmission control element; a centrifugal clutch including clutch operating mechanism adapted to assume either a position in which it is speed-responsive or a lock-up position in which it maintains the clutch in engaged condition irrespective of speed, means controlled by said transmission control element for causing said mechanism to assume its lock-up position when said transmission control element is moved from low or reverse gear position to intermediate or high gear position, and means controlled by said brake operating device for rendering said last means inoperative so as to cause said mechanism to assume its speed-responsive position when said device is operated to apply the brakes.

12. In a clutch system for a motor vehicle having a brake operating device, a transmission having a driving range and a starting range and a transmission control element; a centrifugal clutch including clutch operating mechanism adapted to assume either a position in which it is speed-responsive, or a lock-up position in which it maintains the clutch in engaged condition irrespective of speed, a fluid motor controlled by said transmission control element when said brake operating device is in inoperative position and operatively associated with said mechanism so as to cause the same to assume its lock-up position when said transmission is adjusted to the driving range, and means controlled by said brake operating device for rendering said fluid motor inoperative so as to cause said mechanism to assume its speed-responsive position when said device is operated to apply the brake.

13. In a clutch system for a motor vehicle having a braking mechanism and a change speed transmission and wherein said transmission has a driving range and a starting range; a centrifugal clutch including clutch operating mechanism adapted to assume either a position in which it is speed-responsive, or a lock-up position in which it maintains the clutch in engaged condition irrespective of speed; a fluid motor operatively associated with said mechanism, means for supplying fluid to said motor for operating the same so as to cause said mechanism to assume its lock-up position when said transmission is adjusted to the driving range, a valve for controlling said fluid motor, and a yielding connection between said valve and said brake-operating device arranged to allow admission of fluid to said motor when said brake-operating device is in inoperative position, and to cut off the admission of fluid to said motor and allow the fluid therein to escape therefrom so as to cause said mechanism to assume its speed-responsive position during the initial stage of movement of said brake operating device in applying the brake.

14. In a clutch system for a motor vehicle having a braking mechanism and a change speed transmission and wherein said transmission has a driving range and a starting range; a centrifugal clutch including clutch operating mechanism adapted to assume either a position in which it is speed-responsive, a lock-up position in which it maintains the clutch in engaged condition irrespective of speed, or a full release position in which it maintains the clutch in disengaged condition irrespective of speed; resilient means urging said clutch operating mechanism from its lock-up position toward its speed-responsive position, means controlled in accordance with the gear ratio setting of said transmission for counteracting the effect of said resilient means and causing said clutch operating mechanism to assume its lock-up position when said transmission is adjusted to its driving range, means controlled by said brake-operating device for rendering said last named means inoperative and allowing said resilient means to become operative when the brake is applied, and an operative connection between said clutch pedal and said clutch whereby said clutch may be adjusted to full release position by depression of said pedal.

15. In a clutch system for a motor vehicle having a braking mechanism and a change speed transmission and wherein said transmission has a driving range and a starting range; a centrifugal clutch including clutch operating mechanism adapted to assume either a position in which it is speed-responsive, or a lock-up position in which it maintains the clutch in engaged condition irrespective of speed, said clutch operating mechanism including spring means urging it toward its lock-up position, resilient means adapted to overcome the effect of said spring means and to move said clutch operating mechanism from its lock-up position toward its speed-responsive position, means controlled in accordance with the gear ratio setting of said transmission for counteracting the effect of said resilient means and causing said clutch operating mechanism to assume lock-up position when said transmission is adjusted to the driving range, and means controlled by said brake-operating device for rendering said last means inoperative, and the resilient means operative, when the brakes are applied.

16. In a clutch system for a motor vehicle having a braking mechanism and a change speed transmission and wherein said transmission has a driving range and a starting range; a centrifugal clutch including clutch operating mechanism adapted to assume either a position in which it is speed-responsive or a lock-up position in which it maintains the clutch in engaged condition irrespective of speed, said clutch operating mechanism including spring means urging it toward its lock-up position, resilient means adapted to overcome the effect of said spring means and to move said clutch operating mechanism from its lock-up toward its speed-responsive position, a fluid motor operative to counteract the effect of said resilient means and a valve controlling said motor so as to normally allow admission of fluid thereto for operating the same when said transmission is adjusted to driving range, said valve being operatively connected to said brake-operating device so as to cut off the admission of fluid to said motor and release the fluid therein so as to allow said resilient means to become operative when the brakes are applied.

17. In a clutch system for a motor vehicle having a braking mechanism and a change speed transmission and wherein said transmission has a driving range and a starting range; a centrifugal clutch including clutch operating mechanism adapted to assume either a position in which it is speed-responsive, or a lock-up position in which it maintains the clutch in engaged condition irrespective of speed, said clutch operating mechanism including spring means urging it toward lock-up position, resilient means adapted to overcome the effect of said spring means and to move said clutch operating mechanism from lock-up position toward speed-responsive position, a fluid motor operative to counteract the effect of said resilient means, fluid pumping means for delivering fluid under pressure to said motor for operating the same, a valve interposed between said pumping means and said motor and controlled in accordance with the gear ratio settling of said transmission for admitting fluid to said motor when said transmission is adjusted to the driving range, and a valve operatively connected to said brake operating device so as to allow admission of fluid to said motor when the brake is not applied, and to cut off communication between said motor and said first mentioned valve and to release the fluid in the motor when the brake is applied.

18. In a clutch system for a motor vehicle having a brake-operating device; a centrifugal clutch including clutch operating mechanism adapted to assume either a position in which it is speed-responsive, a lock-up position in which it maintains the clutch in engaged condition irrespective of speed, or a full release position in which it maintains the clutch in disengaged condition irrespective of speed, a rock shaft operatively connected to said clutch operating mechanism, a clutch pedal having a lost motion connection with said rock shaft whereby said rock shaft may be rotated so as to move said clutch operating mechanism to full release position, resilient means having a lost motion connection with said shaft capable of rotating the same so as to move the clutch operating mechanism from lock-up position to speed-responsive position but not to full release position, power means for counteracting the effect of said resilient means, and means operatively connected to said brake operating device for rendering said power means inoperative so as to render said resilient means operative when said brake-operating device is operated to apply the brake.

19. In a clutch system for a motor vehicle having a braking mechanism and a change speed transmission and wherein said transmission has a driving range and a starting range and a transmission control element; a centrifugal clutch including clutch operating mechanism adapted to assume either a normal position in which it is speed-responsive, a lock-up position in which it maintains the clutch in engaged condition irrespective of speed, or a full release position in which it maintains the clutch in disengaged condition irrespective of speed, and a rock shaft operatively connected to said clutch-operating mechanism and adapted to move the same from lock-up position toward normal and full release positions, said clutch operating mechanism including spring means opposing the action of said rock shaft, a clutch pedal having a lost motion connection with said rock shaft, whereby said clutch operating mechanism may be moved to full release position, resilient means yieldingly urging said rock shaft in a direction to move said clutch operating mechanism from lock-up position toward speed-responsive position, stop means limiting the action of said resilient means so as to prevent its effecting movement of the clutch operating mechanism beyond speed-responsive position, means controlled by said transmission control element for rendering said resilient means inoperative when said transmission is adjusted to the driving range, and means controlled by said brake-operating device for rendering said last named means inoperative so as to render the resilient means operative when the brake is applied.

20. In a clutch system for a motor vehicle having a braking mechanism and a change speed transmission having a driving range and a starting range, a speed responsive clutch adapted normally to be in engagement irrespective of speed when the transmission is in the driving range, and means arranged to be operated by operation of said braking mechanism for rendering said clutch capable of becoming disengaged when the brake is applied while the transmission remains adjusted to the driving range.

21. In a clutch system for a motor vehicle including a change speed transmission having a driving range and a starting range, and a transmission control element; a centrifugal clutch including clutch operating mechanism adapted to assume either a normal position in which it is speed-responsive, a lock-up position in which it maintains the clutch in engaged condition irrespective of speed, or a full release position in which it maintains the clutch in disengaged condition irrespective of speed, and a rock shaft operatively connected to said clutch-operating mechanism and adapted to move the same from lock-up position toward normal and full release positions, said clutch operating mechanism including spring means opposing the action of said rock shaft; a clutch pedal having a lost motion connection with said rock shaft, whereby said clutch operating mechanism may be moved to full release position, resilient means yieldingly urging said rock shaft in a direction to move said clutch operating mechanism from lock-up position toward speed-responsive position, stop means limiting the action of said resilient means so as to prevent its effecting movement of the clutch operating mechanism beyond speed-responsive position, means controlled by said transmission control element for rendering said resilient means inoperative when said transmission is adjusted to the driving range, and manually operable means for rendering said last means inoperative so as to render the resilient means operative when the brake is applied.

22. In a clutch system for a motor vehicle, a centrifugal clutch including clutch operating mechanism adapted to assume either a position in which it is speed-responsive, a lock-up position in which it maintains the clutch in engaged condition irrespective of speed, or a full release position in which it maintains the clutch in disengaged condition irrespective of speed, a rock shaft operatively connected to said clutch operating mechanism, a clutch pedal having a lost motion connection with said rock shaft whereby said rock shaft may be rotated so as to move said clutch operating mechanism to full release position, resilient means having a lost motion connection with said shaft capable of rotating the same so as to move the clutch operating mechanism from lock-up position to speed-responsive position but not to full release position, power means for counteracting the effect of said resilient means, and manually operable means for rendering said power means inoperative so as to render said resilient means operative when said brake operating device is operated to apply the brake.

23. In a clutch system for a motor vehicle including a change speed transmission having a driving range and a starting range; a centrifugal clutch including clutch operating mechanism adapted to assume either a position in which it is speed-responsive, or a lock-up position in which it maintains the clutch in engaged condition irrespective of speed, said clutch operating mechanism including spring means urging it toward lock-up position, resilient means adapted to overcome the effect of said spring means and to move said clutch operating mechanism from lock-up position toward speed-responsive position, a fluid motor operative to counteract the effect of said resilient means, fluid pumping means for delivering fluid under pressure to said motor for operating the same, a valve interposed between said pumping means and said motor and controlled in accordance with the gear ratio setting of said transmission for admitting fluid to said motor when said transmission is adjusted to the driving range, and a manually operated valve adapted when in one position to admit to said motor fluid delivered from said first mentioned valve and when in another position to release fluid from said motor and to cut off communication between said motor and said first-mentioned valve.

24. In a clutch system for a motor vehicle including a change speed transmission having a driving range and a starting range, and a transmission control element; a centrifugal clutch including clutch operating mechanism adapted to assume either a normal position in which it is speed-responsive, a lock-up position in which it maintains the clutch in engaged condition irrespective of speed, or a full release position in which it maintains the clutch in disengaged condition irrespective of speed, and a rock shaft operatively connected to said clutch-operating mechanism and adapted to move the same from lock-up position toward normal and full release positions, said clutch operating mechanism including spring means opposing the action of said rock shaft; a clutch pedal having a lost motion connection with said rock shaft, whereby said clutch operating mechanism may be moved to full release position, resilient means yieldingly urging said rock shaft in a direction to move said clutch operating mechanism from lock-up position toward speed-responsive position, stop means limiting the action of said resilient means so as to prevent its effecting movement of the clutch operating mechanism beyond speed-responsive position, means controlled by said transmission control element for rendering said resilient means inoperative when said transmission is adjusted to the driving range, and manually operable means for rendering said last means inoperative so as to render the resilient means operative.

25. In a clutch system for a motor vehicle, a centrifugal clutch including clutch operating mechanism adapted to assume either a normal position in which it is speed-responsive, a lock-up position in which it maintains the clutch in engaged condition irrespective of speed, or a full release position in which it maintains the clutch in disengaged condition irrespective of speed, a rock shaft operatively connected to said clutch operating mechanism, a clutch pedal having a lost motion connection with said rock shaft whereby said rock shaft may be rotated so as to move said clutch operating mechanism to full release position, resilient means having a lost motion connection with said shaft capable of rotating the same so as to move the clutch operating mechanism from lock-up position to speed-responsive position but not to full release position, power means for counteracting the effect of said resilient means, and manually operable means for rendering said power means inoperative so as to render said resilient means operative.

HAROLD NUTT.
HAROLD V. REED.